(12) United States Patent
Wang et al.

(10) Patent No.: US 11,425,321 B1
(45) Date of Patent: Aug. 23, 2022

(54) ANTI-BLOOMING PASSIVE SENSORS

(71) Applicant: CMOS Sensor, Inc., Cupertino, CA (US)

(72) Inventors: Weng Lyang Wang, Saratoga, CA (US); Hui Wei, San Jose, CA (US)

(73) Assignee: CMOS Sensor, Inc., Cupertino, CA (US)

( * ) Notice: Subject to any disclaimer, the term of this patent is extended or adjusted under 35 U.S.C. 154(b) by 0 days.

(21) Appl. No.: 17/529,292

(22) Filed: Nov. 18, 2021

(51) Int. Cl.
*H04N 5/359* (2011.01)
*H04N 5/357* (2011.01)
*H04N 5/378* (2011.01)
*G06V 40/13* (2022.01)

(52) U.S. Cl.
CPC ........... *H04N 5/3591* (2013.01); *G06V 40/13* (2022.01); *H04N 5/3575* (2013.01); *H04N 5/378* (2013.01)

(58) Field of Classification Search
None
See application file for complete search history.

(56) References Cited

U.S. PATENT DOCUMENTS

2018/0295299 A1\* 10/2018 Kudoh .................. H04N 5/378

\* cited by examiner

*Primary Examiner* — Mark T Monk
(74) *Attorney, Agent, or Firm* — Joe Zheng (57) ABSTRACT

Designs of an anti-blooming sensing element or simply sensor are described. According to one aspect of the designs, each sensing element includes a photosensor, a pair of first and second circuits, a store device and a readout circuit. The first and second circuits, sandwiching the photosensor from a circuit perspective, are mirrored and balanced in impedance. The first circuit provides an inherent mechanism to discharge excessive charge accumulated on the photosensor before a predefined exposure time ends. Each of the two circuits includes two transistors.

17 Claims, 11 Drawing Sheets

Prior Art

Command Set along with SPI Clock

| Command | Code | Bytes | SPI Clocks | Sensor States |
|---|---|---|---|---|
| Write Configure | A5 | 3 | 24 | Setup |
| Read Configure | 5A | 3 | 24 | Setup |
| Read Status | 3C | 3 | 24 | Setup |
| Start Scan | 78 | 1 | T1+T2 | Exposure |
| Read Data | C3 | 1 | T3 | Read Out |

ANTI-BLOOMING PASSIVE SENSORS

BACKGROUND OF THE INVENTION

1. Field of the Invention

The present invention is related to the area of image sensors. More particularly, the present invention is related to an optical image sensor and circuitry with a minimum number of pins to interface with other circuits or modules. One application of such sensor modules can be effectively used for acquiring biosignals from a human body part (e.g., print of finger) in a portable device.

2. Description of Related Art

Smart phones have become the fastest-selling gadgets in history, outstripping the growth of the simple mobile phones that preceded them many years ago. Today more than half the adult population owns a smart phone. Smart phones have also penetrated every aspect of daily life. With proper applications, a smart phone can fulfill the needs for a telephone, digital camera and video camera, GPS navigation, a media player, clock, news, calculator, web browser, handheld video game player, flashlight, compass, an address book, note-taking, digital messaging, an event calendar, and etc. With the rapid improvement of hardware and software in smart phones, the need and development of point-of-care testing (POC Testing) based on the smart phones is rapidly growing.

Point-of-care (POC) testing, originally referred to as bedside testing, is defined as medical diagnostic testing at or near a point of care, that is, at the time and place of patient care. The POC testing contrasts with the tradition in which testing was wholly or mostly confined to a medical laboratory, thus requiring a patient to travel away from home. Now with a smart phone equipped with certain sensors and loaded with certain applications, many simple medical tests could be performed anywhere close to the patient.

The driving notion behind the POC testing is to bring some medical tests conveniently and immediately to a patient, which increases the likelihood that the patient, his/her physician or care team receives the results quickly, for possible clinical management or decisions if needed. Although still limited in the types of the POC tests that may be conducted by a patient him/herself, a smart phone is mainly used in biosensing assays, acting as detectors, data processors, and even signal inducers with or without an additional custom designed cradle or attachment used to mount other components.

Almost all smart phones have an image sensor. One application of the image sensor in the field of biometrics is to verify an identity of a user by capturing an image of the user, for example, a body part (e.g., skin, finger, eye or face) so as to wake up a device, activate an application and pay bills. Typical biometric measurement is based on digitized images of fingerprints, iris patterns in the eye, hand shapes, or hand vein patterns as a basis for identity verification. However, the image sensor used for the biometric applications is the one primarily designed for photos or videos, typically in high-resolution and can be expensive in terms of what is being captured (e.g., fingerprint). Thus there is a need for sensor modules that are low in cost but sensitive to the biological changes on a body part.

The commonly used image sensor (e.g., CCD/CMOS) employs several dedicated clocks to generate the control timing that the image sensor needs to operate before it sends out a frame of image data. These clocks have to be precise, thus complicating the designs of clocking circuits and taking considerable resources for just getting the required clock signals. For the application of fingerprint recognition (normally just a snapshot of a finger), using a traditional image sensor is way overkill and can be expensive in terms of the resources needed to extract usable data from the massive image data provided by the traditional Image sensor. There is thus another need for a relatively less complicated image sensor module with simple control and minimum interfaces with other circuits.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to designs of a sensor module and its placement in a portable device. According to one aspect of the present invention, the sensor module operates on a predefined number of clocks in contrast of rising or falling edges of clocks or pulses commonly relied upon in a prior art image sensor, thus reducing considerably the requirement on the clocks. Subsequently, the complexity of supporting circuits with the sensor module can be simplified.

According to another aspect of the present invention, the number of pins or interfaces with the supporting circuits are minimized, the complexity of supporting circuits with the sensor module can be simplified.

According to still another aspect of the present invention, one of the pins is used as a power supply and reset signal. By changing the status of the power supply, from low to high or from high to low, the sensor module is caused to enter a setup state, from which the sensor module goes from an exposure state to a readout state before going back to the setup state.

According to still another aspect of the present invention, the sensor module includes a state machine operating on a counter counting clocks. The state machine has at least three states, setup state, exposure state and readout state. The state machine changes from one state to another upon the counter reaching a predefined number of clocks.

According to yet another aspect of the present invention, the sensor module includes an array of image sensors, where the array of image sensors may be linear or two-dimensional. Depending on implementation, the array of image sensors may be implemented with differential photosensors or anti-booming photosensors.

The present invention may be implemented in various ways including a method, a circuit, an apparatus or a system. According to one embodiment, the present invention is a sensor module comprising an array of sensing modules, a first pin provided to receive a power signal, wherein the power signal is caused to impose a reset clock on the pin and the rest clock causes the sensor module to enter a standby state. The sensor module also comprises a state machine having at least three definitive states, a counter receiving a clock signal via a second pin. The counter counting a number of clocks in the clock signal. The state machine enters one of three definitive states from the standby state once the number of clocks reaches a predefined number of clocks for the standby state. The state machine changes from one state to another state every time the counter reaches a predefined number of clocks for each of the states, wherein the array of sensors is caused to expose to a scene and output sensing signals in two of the three definitive states, the sensing signals are eventually read out via a third pin.

According to another embodiment, the present invention is a system that can be used in a device to capture images, biosignals and others. The system comprises: an array of sensing elements, each of the sensing elements including: a photosensor, a pair of first and second circuits, mirrored and balanced in impedance, wherein the first and second circuits sandwich the photosensor from a circuit perspective, the first circuit providing an inherent mechanism to discharge excessive charge accumulated on the photosensor before a predefined exposure time ends. Each of the sensing elements includes further a store device to receive charge accumulated on the photosensor; and a readout circuit, coupled to the store device, to read out a sensing signal from the store device.

Different objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Embodiments of the invention are discussed below with reference to FIGS. 1-6C. However, those skilled in the art will readily appreciate that the detailed description given herein with respect to these figures is for explanatory purposes as the invention extends beyond these limited embodiments. As used herein, any pronoun references to gender (e.g., he, him, she, her, etc.) are meant to be gender-neutral. Unless otherwise explicitly stated, the use of the pronoun "he", "his" or "him" hereinafter is only for administrative clarity and convenience. Additionally, any use of the singular or to the plural shall also be construed to refer to the plural or to the singular, respectively, as warranted by the context.

Figures 1A, 1B:
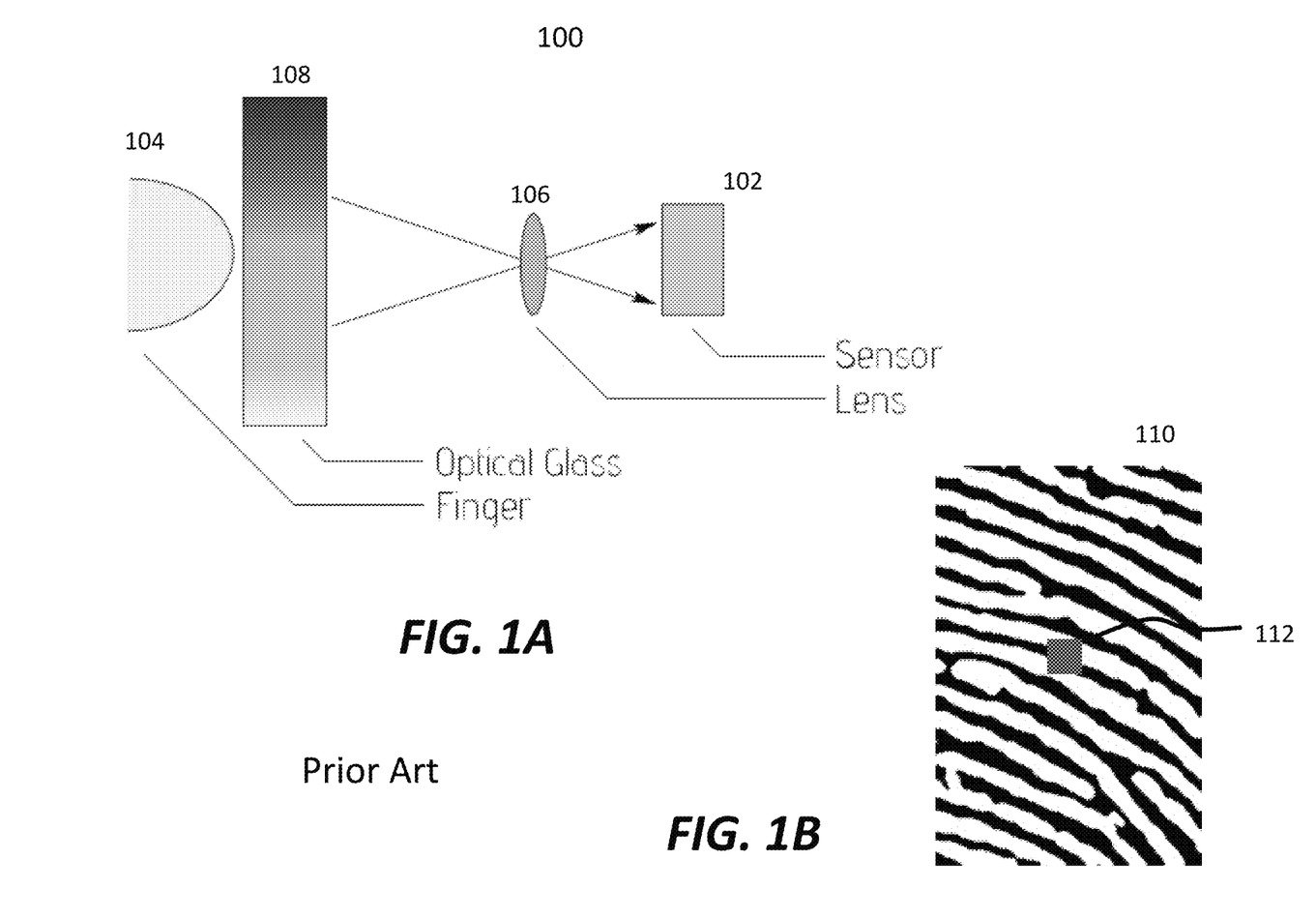
FIG. 1A shows a configuration in which an optical sensor is used to detect biological changes on a body part (e.g., finger)
FIG. 1B shows an example of a partial finger image, where only a small area is captured or used by the sensor for the measurement of the biological changes in the finger.

Referring now to the drawings, in which like numerals refer to like parts throughout the several views. FIG. 1A shows a configuration 100 in which an optical sensor 102 is used to detect biological changes on a body part 104. In general, an optical lens 106 is used to focus optical signals reflected from the body part 104 onto the sensor 102. The optical lens is a lens reduction type system to focus the large area of object plane to a small area of the image plane. A transparent substrate 108 (e.g., a piece of glass) is used to protect the sensor 102 and the lens 106 while holding the focal distance between the body part 104 and the lens 106. FIG. 1B shows an example of a partial finger image 110, where only a small area 112 is captured or used by the sensor 102 for the measurement of the biological changes in the finger.

Figure 2:
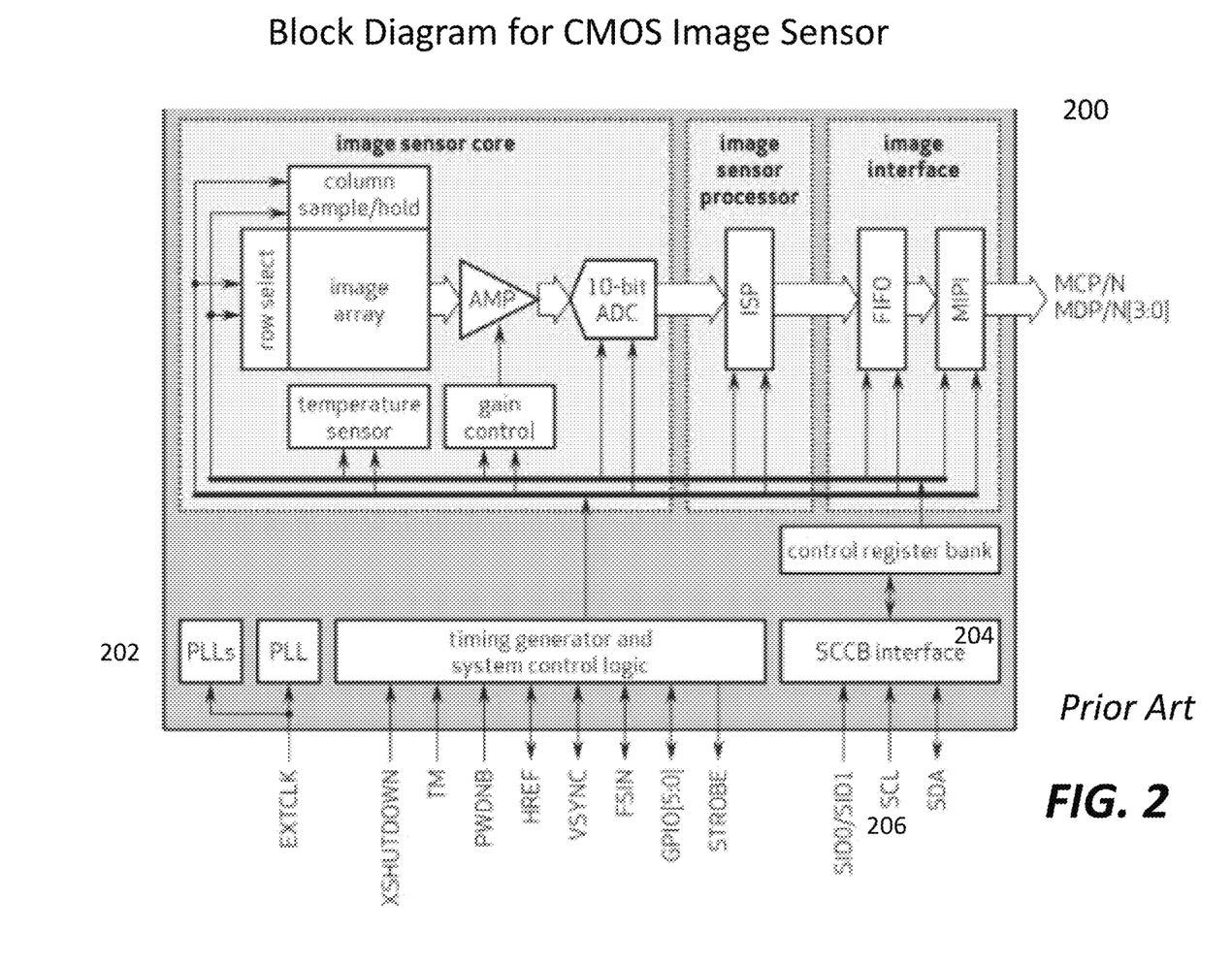
FIG. 2 shows an exemplary configuration diagram of a commonly used sensor module including an image array of sensing elements (e.g., photosensors or photodiodes) and necessary control or supporting circuitry.

FIG. 2 shows an exemplary configuration diagram of a commonly used sensor module 200 including an image array of sensing elements (e.g., photodiodes) and necessary control circuitry. To have all the components work in synchronized fashion, there are over 10 pins (12 shown in FIG. 2) in the sensor 200. These pins create a considerable level of design complexity between the sensor 200 and other external components that are need to control the operation of the sensor 200 and use the data generated therefrom.

As shown in FIG. 2, the sensor module 200 includes one or more phase-locked loops or phase lock loops (PLL) 202. An PLL is a control system that generates an output signal whose phase is related to the phase of an input signal. A simplest PLL is an electronic circuit including a variable frequency oscillator and a phase detector in a feedback loop. The oscillator generates a periodic signal, and the phase detector compares the phase of that signal with the phase of the input periodic signal, adjusting the oscillator to keep the phases matched. Keeping the input and output phase in lock step also implies keeping the input and output frequencies the same. Consequently, in addition to synchronizing signals, a phase-locked loop can track an input frequency, or it can generate a frequency that is a multiple of the input frequency. Despite the design complexity of a PLL, the input signal thereto has to be in certain precision, resulting in additional requirements on external clock circuits. A PLL would malfunction if an input clocking signal is missing some clocks or pulses, thus adding additional requirement or complexity in an accompanying clocking circuit.

In addition to the PLL 202, the sensor module 200 has to have an interface to other supporting circuits. FIG. 2 shows that an exemplary interface 204, referred to as Serial Camera Control Bus interface or SCCB, where the SCCB interface 204 is developed by OmniVision Technologies Inc. as a multiwire (e.g., 3-wire) serial bus, for controlling many of the components or parts in the sensor module 200. The SCCB interface 204 operates with a clock signal applied to a SCL pin 206. In operation, the sensor module 200 starts to operate once the SCL pin receives the clock signal. As a result, the clock signal has to be precise. In general, the clock signal cannot be unstable or missing a clock or pulse from time to time.

Figure 3A:
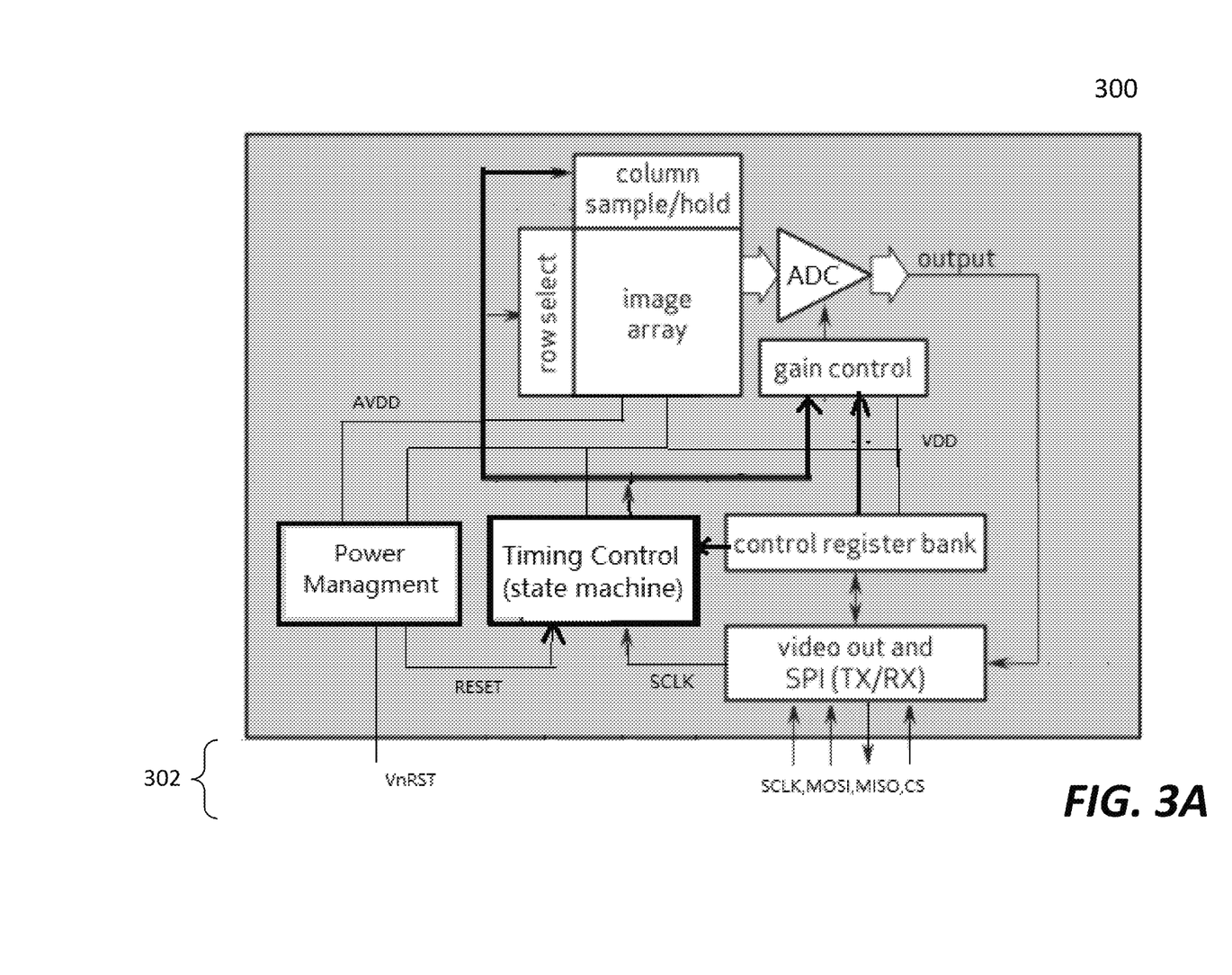
FIG. 3A shows an exemplary configuration diagram of a passive image sensor module according to one embodiment of the present invention.
Figure 3B:
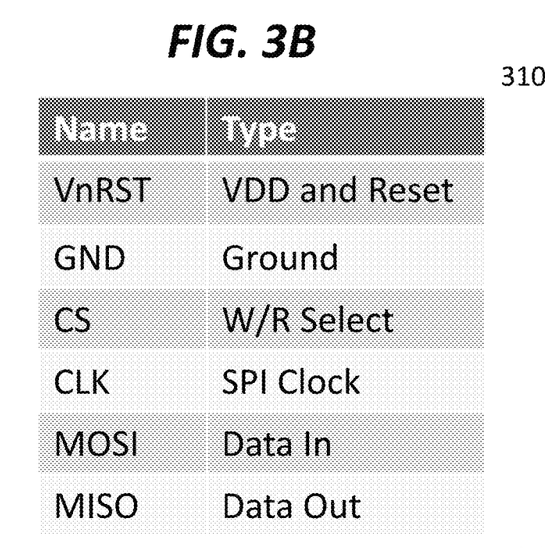
FIG. 3B further shows a table for naming each of six pins according to one embodiment.

FIG. 3A shows an exemplary configuration diagram of a passive image sensor module 300 according to one embodiment of the present invention. One of the advantages, objects and benefits of the image sensor module 300 is the far fewer number of pins thereof, thus reducing the design complexity between the sensor module 300 and other external components that are need to facilitate the operation of the sensor module 300 and use the data generated therefrom. As shown in FIG. 3A, there are all together six pins, where five pins 302 are shown and a ground pin is not shown. FIG. 3B further shows a table 310 for naming each of the six pins according to one embodiment. Among the five pins 302 in FIG. 3A, a pin VnRST is used as a reset and power pin. Operating differently from the module shown in FIG. 2 that is controlled by the interface 204, the module 300 is simply controlled by a reset signal applied thereon, where the reset signal is a voltage, e.g., 0.5V or 3.0V. In other works, the application of the power to the sensor module 300 is controlled. The sensor module 300 starts to operate when the power is active (changed) on the pin VnRST.

Figure 3C:
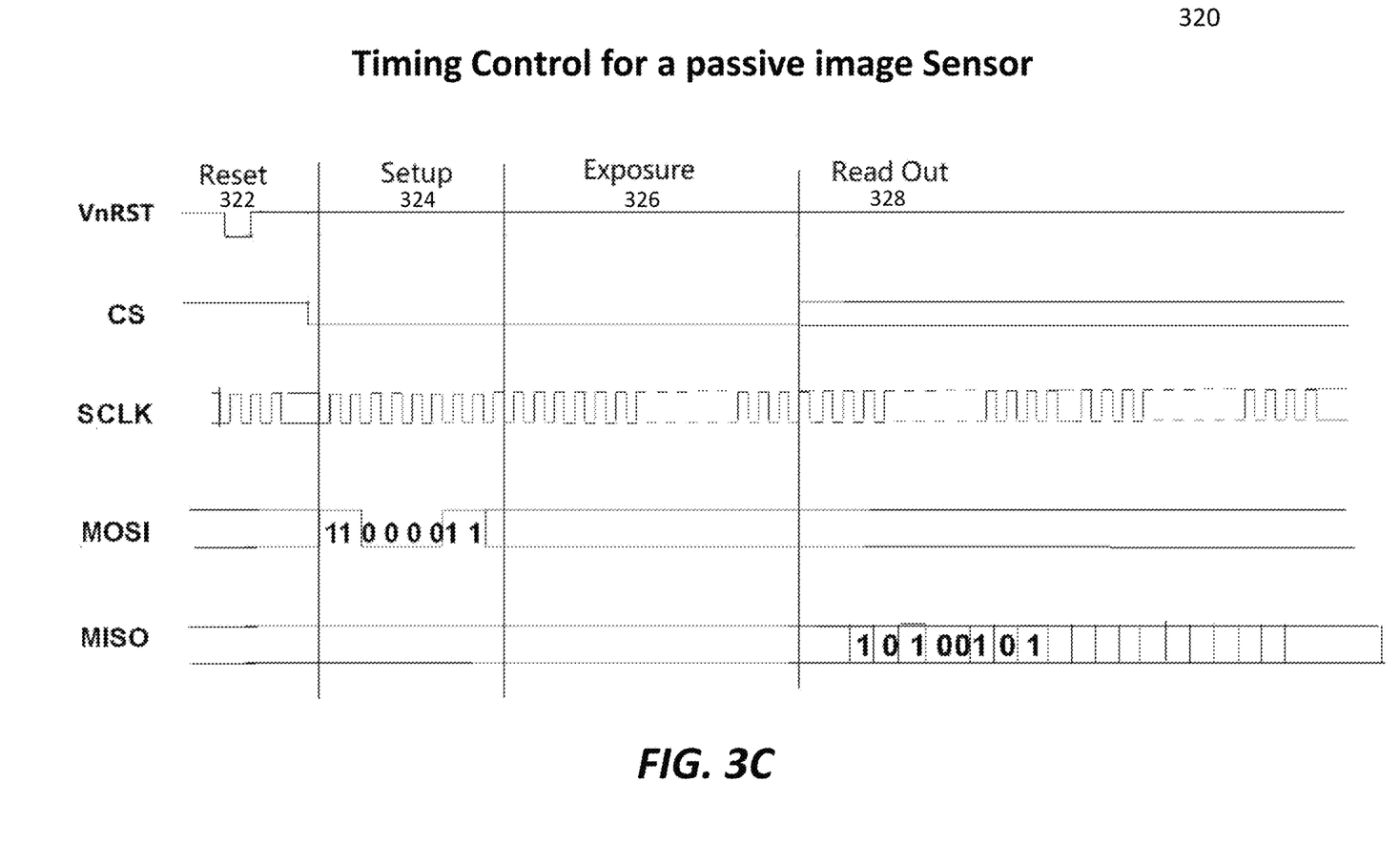
FIG. 3C shows a set of timing curves for all of five pins in a sensor module according to one embodiment of the present invention.

FIG. 3C shows a set of timing curves 320 for all of the five pins 302, where the curves are labeled in four states, Reset (Standby) 322, Setup 324, Exposure 326 and Read out (Readout) 328. In one embodiment, the power is always applied to the pin VnRST (when a system employing the sensor module 300 is turned or powered on. To start a cycle of these four states, the power is dropped to a certain level (e.g., 0V or 0.5V), equivalent to applying a separate pulse to start the sensor module 300. As will be further appreciated, one of the important advantages, benefits and objects is that the sensor module 300 or individual components therein work on a predefined number of clocks or pulses, not exactly on a rising or falling edge of a clock or pulse, thus reducing the precision requirement on the clock signal as well as the clock circuit generating the clock signal.

After a predefined number of clocks, the sensor module 300 enters the Setup state 324, the clocks in the clock signal applied on the SCLK pin start being counted. As stated above, the requirement on the clock signal being applied onto the SCLK pin is much lower than a clock signal used in a prior art sensor module such as the one shown in FIG. 2. According to one embodiment, a clock signal with missing clocks or pulses is usable to the sensor module 200 of FIG. 2, such a clock signal is operationally acceptable to the sensor module of FIG. 3A since the operation of the sensor module 300 depends on the counting of the clocks or pulses in the clock signal. During a time that a predefined number of clocks (e.g., 90 clocks) is being counted, a set of parameters (e.g., exposure time, white balance and etc.) are loaded via the MOSI pin, where the parameters are presented in a sequence of binary numbers as a parameter or setting signal.

Upon reaching the predefined number of clocks designated for the Setup state 324, the sensor module 300 enters an Exposure state 326, where the image sensor or image array in the sensor module 300 is caused to expose to a scene. The exposure time ends when a predefined number of clocks (e.g., 20 clocks) is counted. The Exposure state 326 is immediately followed by a Readout state 328. Depending on the design of row and column selectors in the sensor module 300, the sensing signals from the image array are read out line by line, row by row or from a selected area in the image array. The MISO pin is used to read out the sensing signal. In summary, the sensor module 300 uses the least number of pins to interface with other supporting circuits or components, significantly reducing the complexity of overall system designs.

Figure 3D:
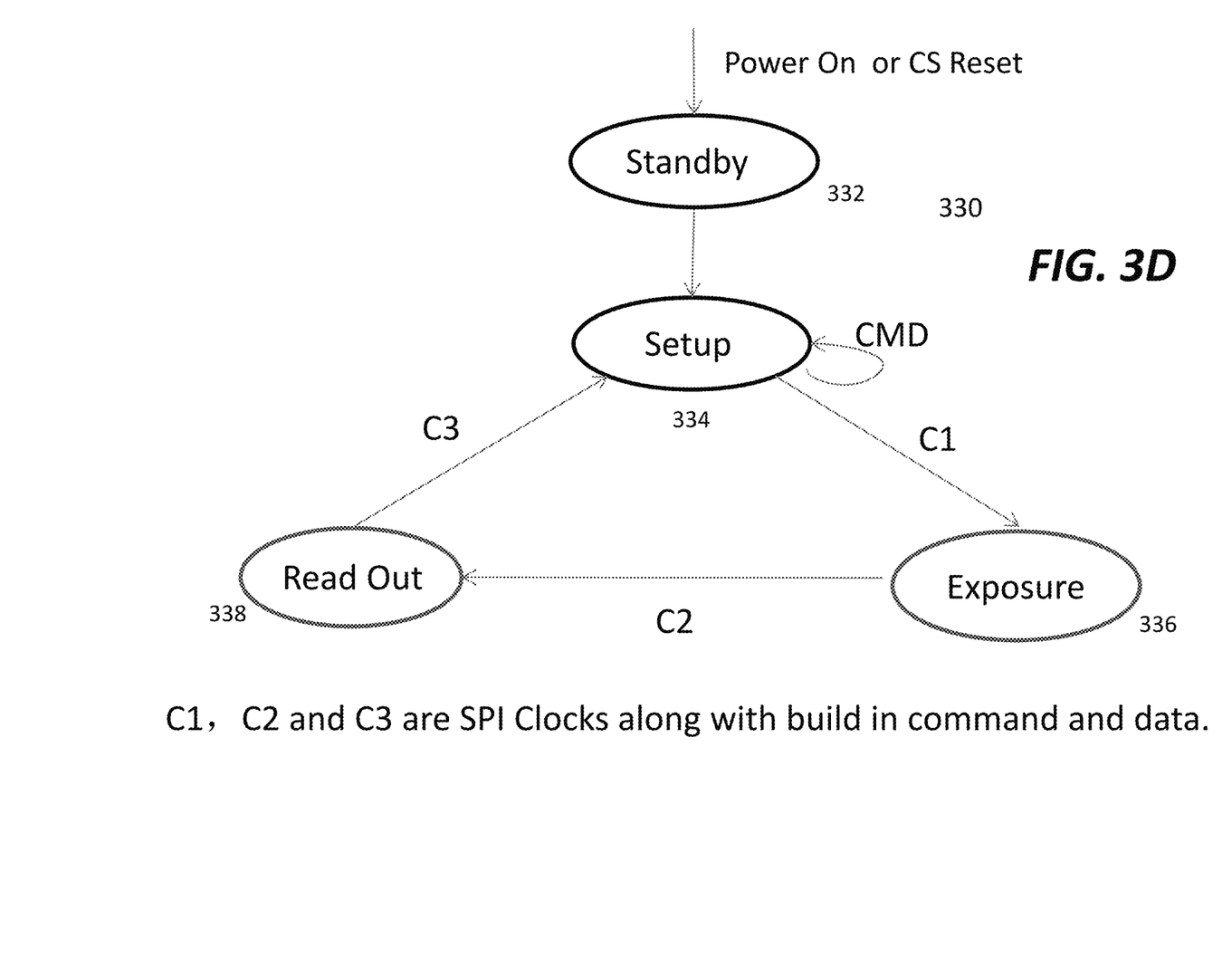
FIG. 3D shows a state machine diagram corresponding to operations of a sensor module in the present invention.

FIG. 3D shows a state machine diagram 330 corresponding to the operation of the sensor module 300. In one embodiment, the sensor module 300 is powered but stays idle, thereby Standby state 332. In another embodiment, the sensor module 300 is not supplied with a power hence stays idle (Standby state 332). In either case, the sensor module 300 enters a Setup state 334 when there is a clock in the reset pin VnRST. The sensor module 300 now enters Setup state 334, waiting for a command signal from the CS pin. It should be noted that the operation of the sensor module 300 enters operates on a predefined number of clocks in the command signal. During the Setup state 334, parameters to control the image quality are loaded via another pin (e.g., MOSI in FIG. 3A). Once the predefined number of clocks is received, the state is now in Exposure state 336, causing the sensor array to be exposed for a predefined period. By the end of a predefined number of clocks, the sensing signals are read out in the Readout state 338. The sensor module 300 returns to the Setup state 334, getting ready for a next exposure.

Figure 3E:
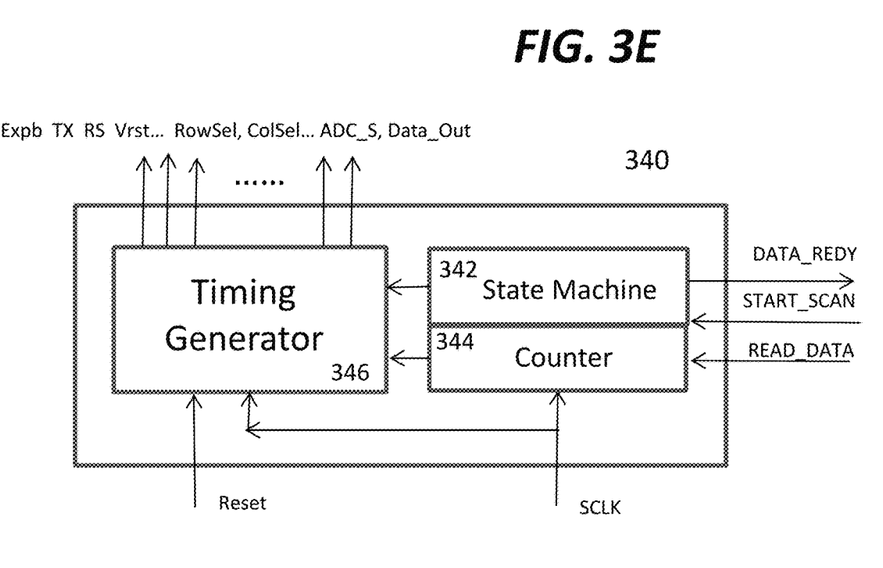
FIG. 3E shows a block diagram including a timing circuit, a state machine and a counter controlling operations of a sensor module in the present invention.

FIG. 3E shows a functional block diagram of a timing module 340 including a state machine 342, a counter 344 and a timing generator 346. There are a few components such as column and row selectors (addressers) that operate based on their own timings. Accordingly, the timing module 340 is provided to generate respective clock signals via the timing generator 346. FIG. 3E shows in one embodiment that the timing module 340 is controlled by the state machine 342 and the counter 344. In operation, the counter 344 outputs a signal when a predefined number of clocks is reached, the signal causes the state machine 342 to switch from one state to another state. Depending on an exact state, the timing generator 346 generates the respective clocking signals.

Figure 3F:
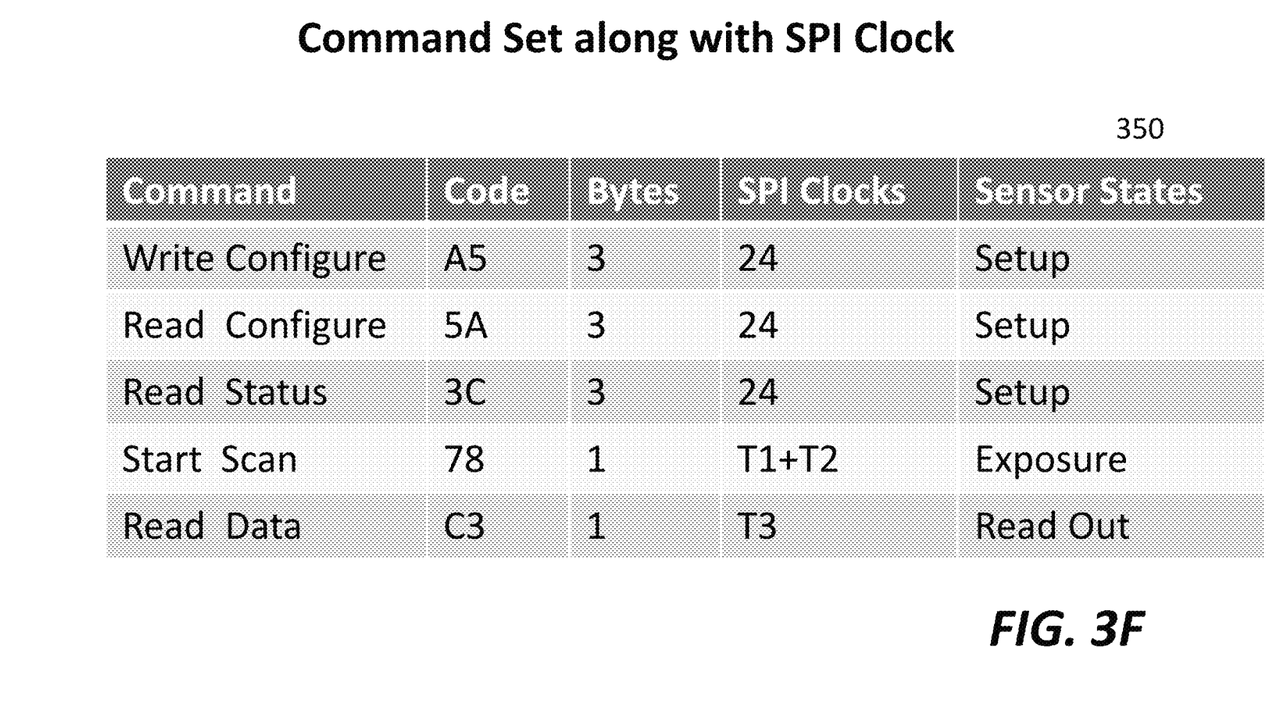
FIG. 3F shows according to one embodiment an example of command set (a set of parameters) embedded in a signal coupled to the MOSI pin, where the command set or parameters are presented in a sequence of binary numbers.

FIG. 3F shows according to one embodiment an example of command set (a set of parameters) 350 embedded in a signal coupled to the MOSI pin, where the command set or parameters are presented in a sequence of binary numbers. Upon reaching a predefined number of clocks in the counter 344, the state machine 342 switches from one state to another state, e.g., Standby state 332 to Setup state 334, the MOSI pin receives a command signal (also a clock signal) carrying the parameters of the command. The command set 350 shows a set of command corresponding to a number of clocks, where the fixed number of clocks indicates a command, for example, begin to read or write, while the variable number of clocks (e.g., T1, T2 and T3) indicates a command that is subject to a change, for example, a time needed for exposure time. In any case, these parameters or commands are provided to the sensor module 300 in clocks or in a predefined number of clocks.

Figure 4:
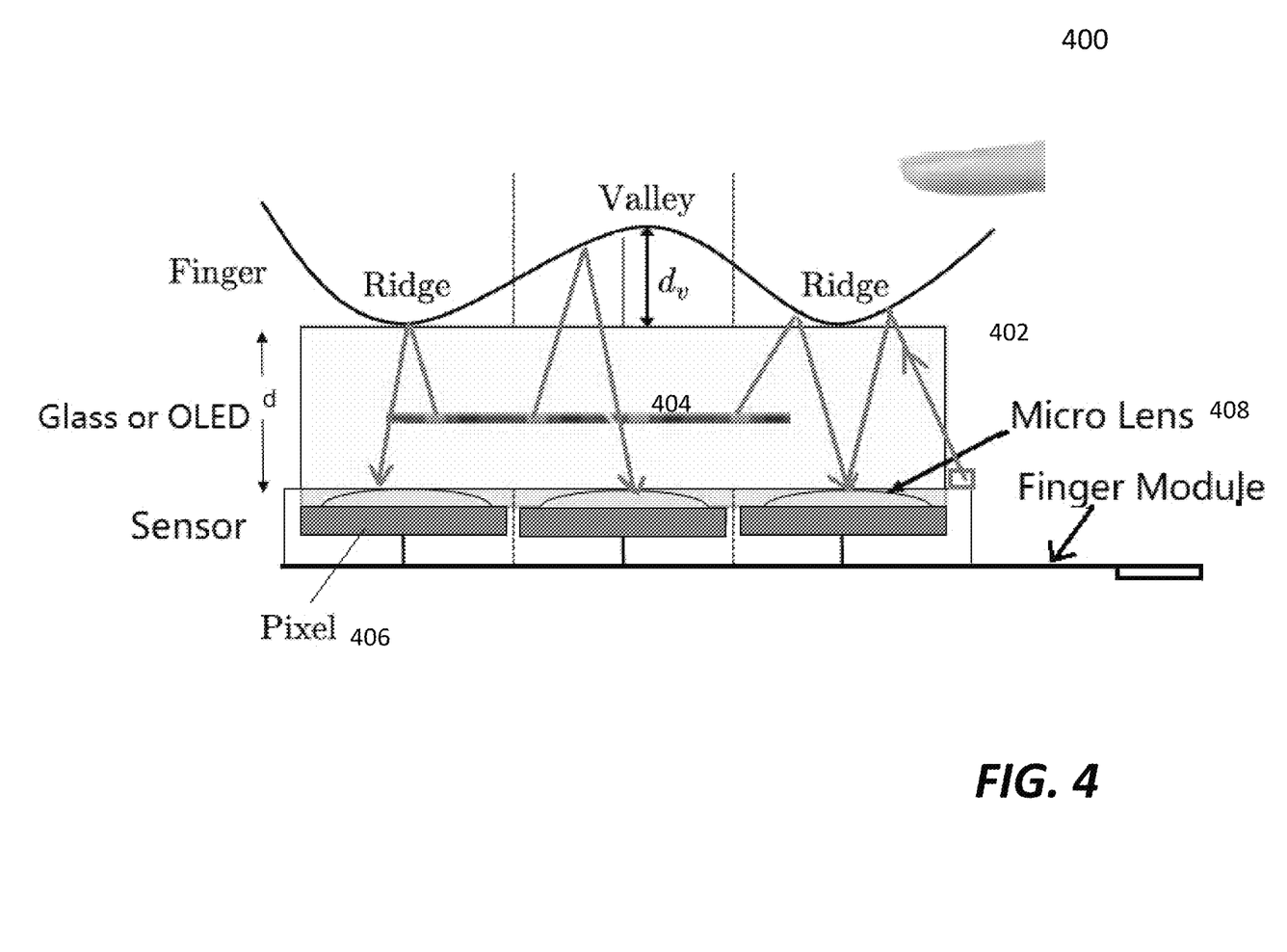
FIG. 4 shows an embodiment in which the sensor module may be used to capture a print of a finger placed on or against a display screen that may be part of a device or system (e.g., smartphone or a health-related device)

FIG. 4 shows an embodiment 400 in which the sensor module 300 may be used to capture a print of a finger placed over, upon or against a display screen 402 that may be part of a device or system (e.g., smartphone or a health-related device). The display screen 402 includes a set of illumination source 404. Depending on implementation, the illumination source 404 may be a set of LED lights or provided by the display screen 402 itself. According to embodiment, the display screen 402 uses an array of self-illuminated elements (e.g., OLED or microLED) to display pictures or videos. These self-illuminated elements may be controlled to illuminate a finger above or on the display screen 402. In one embodiment, only some of the self-illuminated elements in the display screen 402 are turned on to illuminate the area in which a finger is rest upon when there is a need or moment to capture a fingerprint thereof.

When a finger is placed on the display screen 402 and being illuminated by the light source, the ridges and valleys of the finger reflect differently the illumination from the light source 404 to the sensor array 406 via the micro lenses in the sensor module 300, thus forming a fingerprint image.

Figure 5:
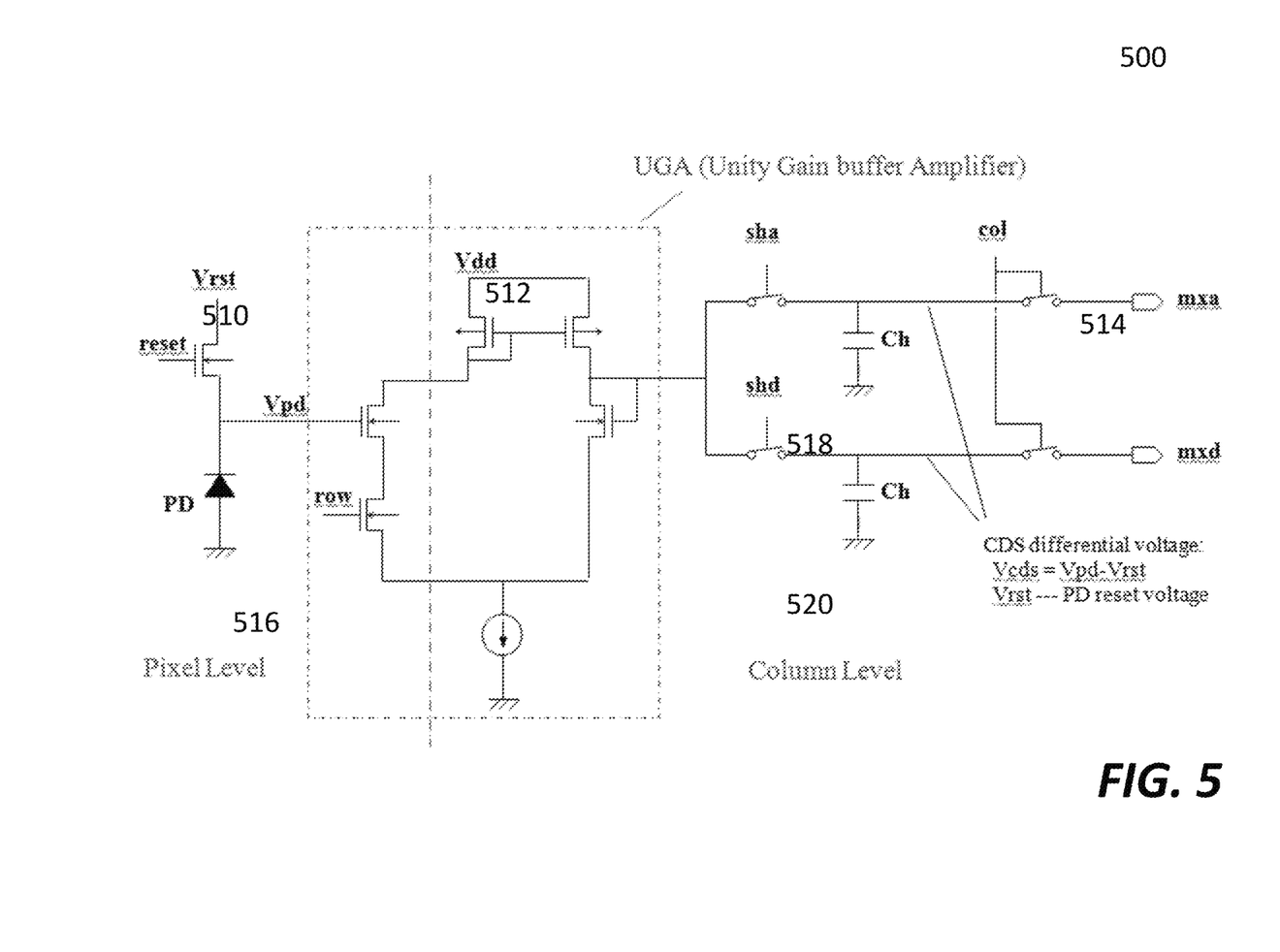
FIG. 5 shows an exemplary design of a photosensor or pixel element coupled with an amplifier and a readout circuit, which may be used in the sensor array in the sensor module of FIG. 3A.

FIG. 5 shows an exemplary design of a photosensor or pixel element 500 with an amplifier 512 and a readout circuit 514 that may be used in the sensor array in the sensor module 300 of FIG. 3A. The pixel element 500 further includes a photosensor 516 that is controlled to be turned on or off. The amplifier 512 is an amplifier provided to amplify the signal produced by the photosensor 516. As an example, the amplifier 512 is implemented with what is called unity gain buffer amplifier (UGBA).

As the name suggests, the amplifier is one that provides electrical impedance transformation from one circuit to another, with the aim of preventing a signal source from being affected by whatever currents or voltages that the load may produce. The readout circuit 514 in FIG. 5 uses an exemplary readout circuit provided to read out the charge accumulated in proportional to the intensity of the light impinged on the diode 516. As an exemplary, the readout circuit 514 is implemented with correlated double sampling (CDS) circuitry to read out the sensing signal from the pixel 510. Another amplifier (not shown) may also be added as a charge integrator to produce a final sensing signal to be coupled for digitization.

The correlated double sampling, or CDS, circuitry is a method employed to improve the signal to noise ratio (S/N) of an image sensor by reading out the pixel 510 twice. The first readout happens right after the exposure of the sensor to a scene. The second readout happens without the sensor is exposed to the scene but soon after the first readout has successfully occurred. Accordingly, the first readout is herein referred to as actual light-induced signal while the second readout is referred to as a reference signal. The reference signal is largely coming from internal dark or reference output level in the pixel. By subtracting the reference output signal from the actual light-induced signal, static fixed pattern noise (FPN) and several types of temporal noise are effectively removed from the output of the sensor. In operation, the first readout of the signal from the photosensor 516 is stored on a capacitor 518 and the second readout the signal from the photosensor 516 is stored on a capacitor 520. The final readout of the signal is the difference between the signals on the capacitors 518 and 520.

Figure 6A:
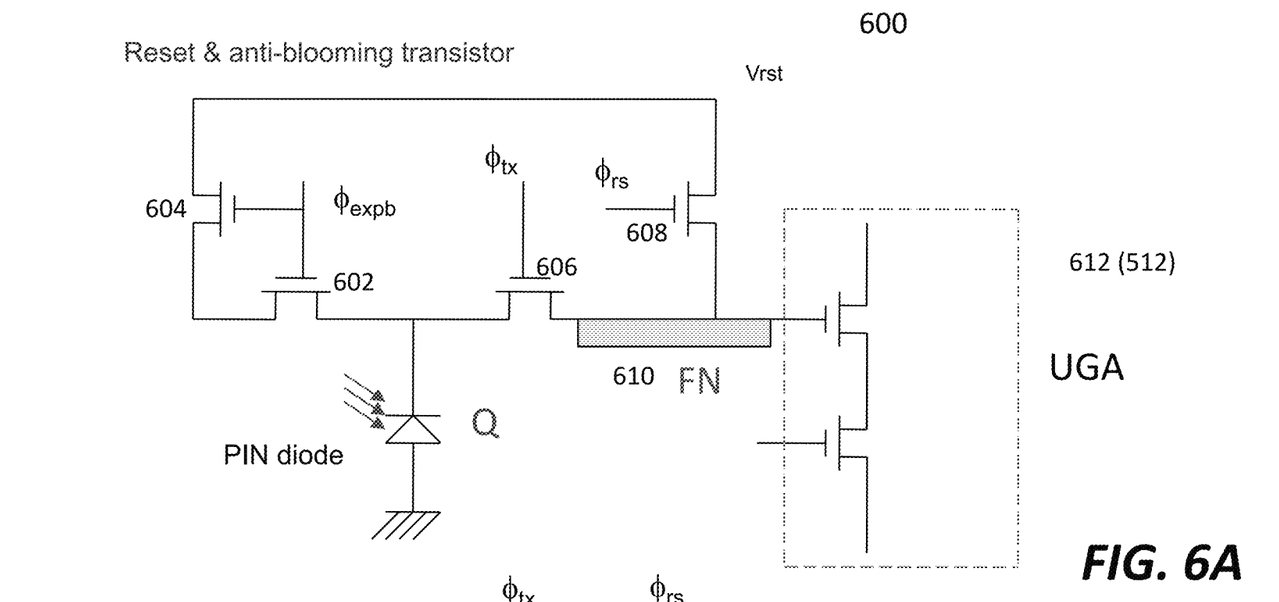
FIG. 6A shows another exemplary design of a photosensor or pixel element that may be used in the sensor array in the sensor module of FIG. 3A.

FIG. 6A shows another exemplary design of a photosensor or pixel or sensor element 600 that may be used in the sensor array in the sensor module 300 of FIG. 3A. One of the objects, benefits and advantages in the sensor element 600 is the embedded mechanism that can prevent saturation. Sensor saturation and blooming are phenomena that often occur in image sensors and it can affect both their quantitative and qualitative imaging characteristics. If each individual pixel can be thought of as a well of electrons, then saturation refers to the condition where the well becomes filled. The amount of charge that can be accumulated in a single pixel is determined largely by its area. However, due to the nature of the potential well, which holds charge within a pixel, there is less probability of trapping an electron within a well that is approaching saturation. Therefore, as a well approaches its limit, the linear relationship between light intensity and signal degrades. As a result, the apparent responsivity of a "saturated" pixel drops. At saturation, pixels lose their ability to accommodate additional charge. This additional charge will then spread into neighboring pixels, causing them to either report erroneous values or also saturate. This spread of charge to adjacent pixels is known as blooming and appears as a white streak or blob in the image.

The sensor element 600 includes a photodiode or photosensor Q that is controlled to be turned on or off in accordance with the parameters provided when in the Exposure state. In operation, prior to being exposed to a scene or the Exposure state, the transistors 602, 604, 606 and 608 are all turned on by a voltage or the signal/voltage applied on the Vrst pin to cause any charges that may have left in a capacitor or other type of charge store FN or 610 to discharge. As soon as the Exposure state starts, the transistors 602, 604 and 606 are all turned off while the transistor 608 is turned on by a voltage or the signal/voltage applied on the Vrst pin to begin charging the photosensor Q from the ambient light via one or more lenses in accordance with the parameters provided.

Figure 6B:
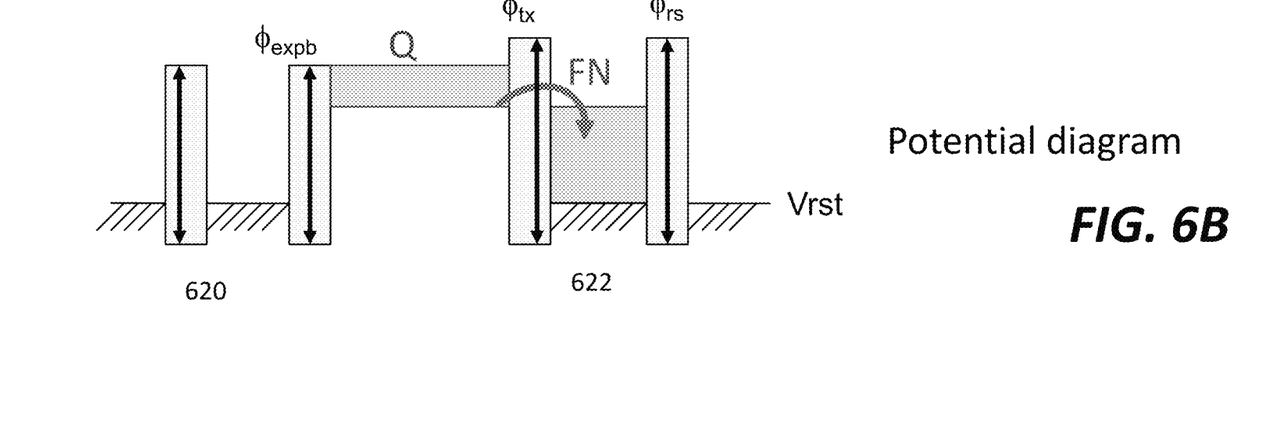
FIG. 6B shows graphically potential or accumulated charge from a photosensor Q is being transferred to a charge store shown also as a well.

One of the important objects, features and advantages in design of the sensor element 600 is an inherent mechanism that can prevent the sensor element 600 from saturation or overcharging. In order words, the sensor element 600 will not be charged beyond a threshold (e.g., the voltage of Vrst). The two transistors 602 and 604 are provided to drain excessive charge from the photosensor Q when the accumulated charge exceeds the threshold. In operation, when the charge in the photosensor Q exceeds the threshold, both of the transistors 602 and 604 are caused to turn on while the transistor 606 remains off. As a result, the excessive charge leaks through the transistors 602 and 604. FIG. 6B shows graphically any excessive charge from the photosensor Q shown as a well can leak to a backup (discharging or leaking) well 620.

It should be noted that the height of the discharging well 620 can be adjusted to control the saturation of the photosensor Q. By controlling the voltage φexpb being applied on the gates of the transistors 602 and 604, the height of the discharging well 620 changes, essentially discharging any accumulated charge in the photosensor Q exceeding φexpb. According to one embodiment, one or more parameters that control or affect φexpb is provided in the setting signal applied to the MOSI pin shown in FIG. 3C. According to another embodiment, one or more parameters that control or affect φexpb may be manually adjusted or automatically determined from lighting reflected from a scene.

When the exposure ends or the Exposure state is switched to the Readout state, the accumulated charge on the photosensor Q starts to be transferred to the charge store 610. When the transistors 602, 604 and 608 are turned off while the transistor 606 is turned on, the accumulated charge on the photosensor Q is transferred to the charge store 610 via the transistor 606. FIG. 6B shows graphically the potential or accumulated charge from the photosensor Q is being transferred to the charge store 610 shown also as a well. Once the charge is transferred from one well Q to another well 622 or FN, the charge in the well FN is readily to be read out to an amplifier 612 that may be implemented similarly to the amplifier 512 of FIG. 5.

It may be noted from FIG. 6B that the sensor element 600 is designed to provide two wells 620 and 622 around the charging well Q, one well 620 for leaking excessive charge from the charging well Q and the other well 622 for transferring (qualified) charge from the charging well Q. From a circuit perspective, these two transistors 602 and 604 form the discharging well 620 while these two transistors 606 and 608 form the store well 622. Both circuits comprising the transistors 602, 604 and the transistors 606, 608 are mirrored and balanced in impedance, effectively controlling possible saturation on the sensor element 600.

Figure 6C:
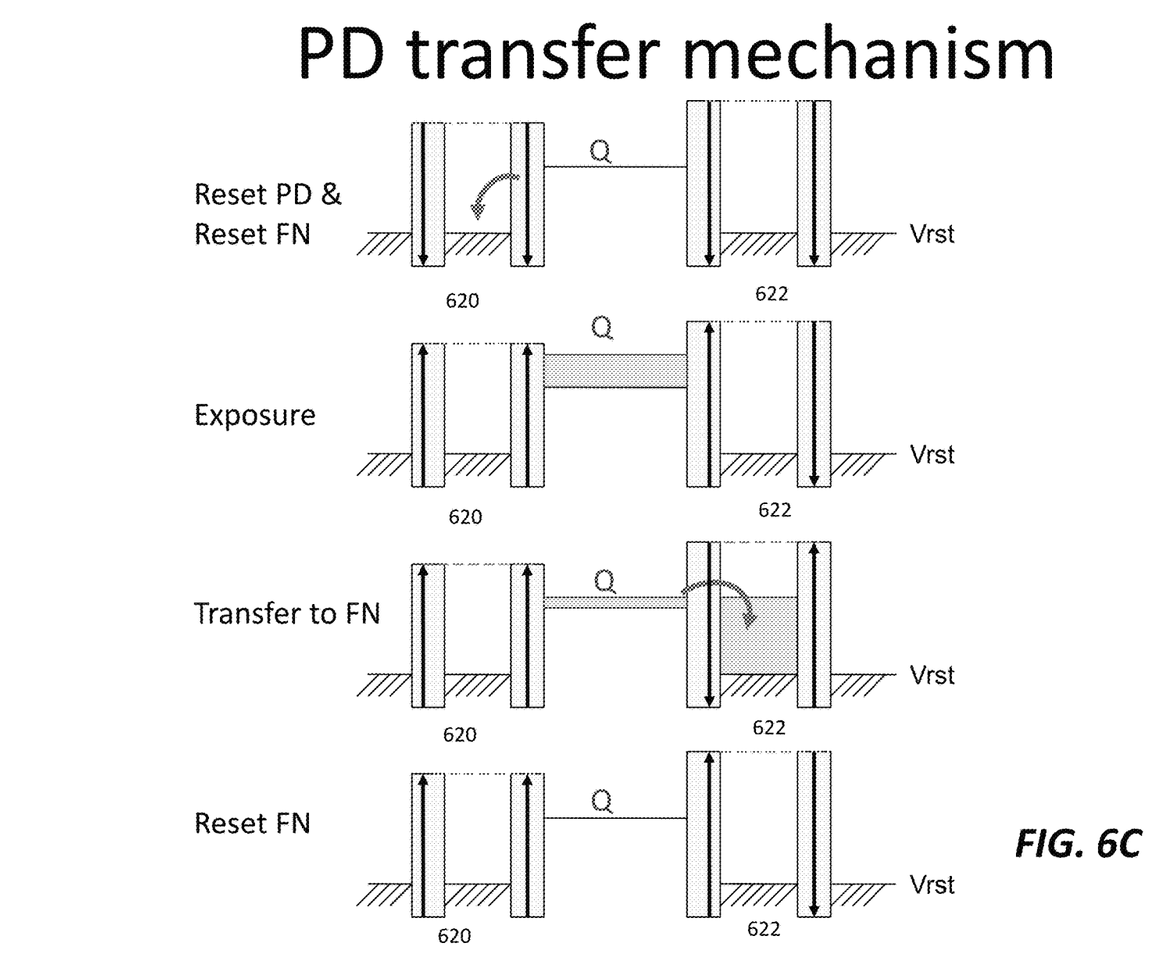
FIG. 6C shows respective processes in each of the states or corresponding operations of how charge is moving between two wells and sandwiching or around the charging well Q.

Referring now to FIG. 6C, it shows respective processes in each of the states or corresponding operations of how charge is moving between the two wells 620 and 622 sandwiching or around the charging well Q. Right before being exposed to a scene or in the Setup state 334 (Reser PD & Reset FN), both of the charging well Q and the store well 622 are reset. The transistors 602, 604, 606 and 608 in FIG. 6A are all turned on. Graphically, the charging well Q is discharging to the discharging well 620 via the transistors 602 and 604 while the store well FN is discharging via the transistors 606 and 608.

In the Exposure state 336 or when the photosensor PD is caused to expose to scene, the charging well Q is collecting or accumulating charge resulting from thee ambient light. Should the charge exceed a threshold during a predefined exposure time (e.g., 1/100 second), the excessive charge will be discharged to the discharging well 620 till the charge remains under or equal to the threshold during the exposure time. In the Readout state 338 or the sensor element 600 is caused to output the sensing signal (Transfer to FN), the charge in the charging well Q is transferred to the store well 622. The transferred charge in the charging well Q is then processed (e.g., amplified) in the following circuit (e.g., the amplifier 612).

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Accordingly, the scope of the present invention is defined by the appended claims rather than the forgoing description of embodiments.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

We claim:

1. A system comprising:
   an array of sensing elements,
      each of the sensing elements including:
         a photosensor, a pair of first and second circuits, mirrored and balanced in impedance, wherein the first and second circuits sandwich the photosensor from a circuit perspective, the first circuit providing an inherent mechanism to discharge excessive charge accumulated on the photosensor before a predefined exposure time ends;
         a store device to receive charge accumulated on the photosensor; and
         a readout circuit, coupled to the store device, to read out a sensing signal from the store device.

2. The system as recited in claim 1, wherein each of the first and second circuits includes first and second transistors.

3. The system as recited in claim 2, wherein gates of the first and second transistors in the first circuit are coupled together and sources of the first and second transistors in the first circuit are also coupled together, a drain of the first transistor in the first circuit is coupled to a power signal, and a drain of the second transistor in the first circuit is coupled to the photosensor.

4. The system as recited in claim 3, wherein a voltage on the gates of the first and second transistors in the first circuit is adjustable to control a discharging level of the photosensor should an excessive charge be accumulated thereon.

5. The system as recited in claim 4, wherein the voltage is provided manually or automatically.

6. The system as recited in claim 3, wherein a drain of the first and source of the second transistor in the second circuit are coupled to the store device, a source of the first transistor in the second circuit is coupled to the photosensor.

7. The system as recited in claim 6, wherein the source of the second transistor in the second circuit being coupled to the store device is also coupled to the readout circuit.

8. The system as recited in claim 7, wherein the store device is a capacitor, the readout circuit is an amplifier provided to amplify the charge in the store device, wherein the charge is transferred from the photosensor after the photosensor has been exposed to a scene.

9. The system as recited in claim 7, wherein the readout circuit is correlated double sampling (CDS) circuitry to read out the sensing signal from the store device.

10. The system as recited in claim 1, further comprising:
a state machine having at least three definitive states;
a counter receiving a clock signal, the counter counting a number of clocks in the clock signal, wherein the state machine enters one of three definitive states from a standby state once the number of clocks reaches a predefined number of clocks for the standby state, the state machine changes from one state to another state every time the counter reaches a predefined number of clocks for each of the states, and
wherein the array of sensing elements is caused to expose to a scene and output sensing signals in two of the three definitive states, the sensing signals are eventually read out via the readout circuit.

11. The system as recited in claim 10, wherein the three definitive states include a Setup state, an Exposure state and a Readout state.

12. The system as recited in claim 11, wherein the Setup state allows the sensor module to receive a set of parameters.

13. The system as recited in claim 12, wherein the Exposure state allows the sensing elements to be exposed to the scene in accordance with at least one of the parameters.

14. The system as recited in claim 13, wherein the Readout state causes the sensing signal to be read out of each of the sensing elements.

15. The system as recited in claim 10, further comprising a timing generator controlled by the state machine and the counter, the timing generator generating respective timing signals in each of the three definitive states in response to a counter signal from the counter.

16. The system as recited in claim 15, wherein the clock signal received does not need to be precise and operates with missing clocks.

17. The system as recited in claim 16, wherein the counter works on the number of clocks in the clock signal, not on a rising or falling edge of the clock signal.

* * * * *